Nov. 26, 1963     J. KAUER     3,112,138
ANTI-SKID ATTACHMENT FOR A VEHICLE WHEEL
Filed May 10, 1962     2 Sheets-Sheet 1
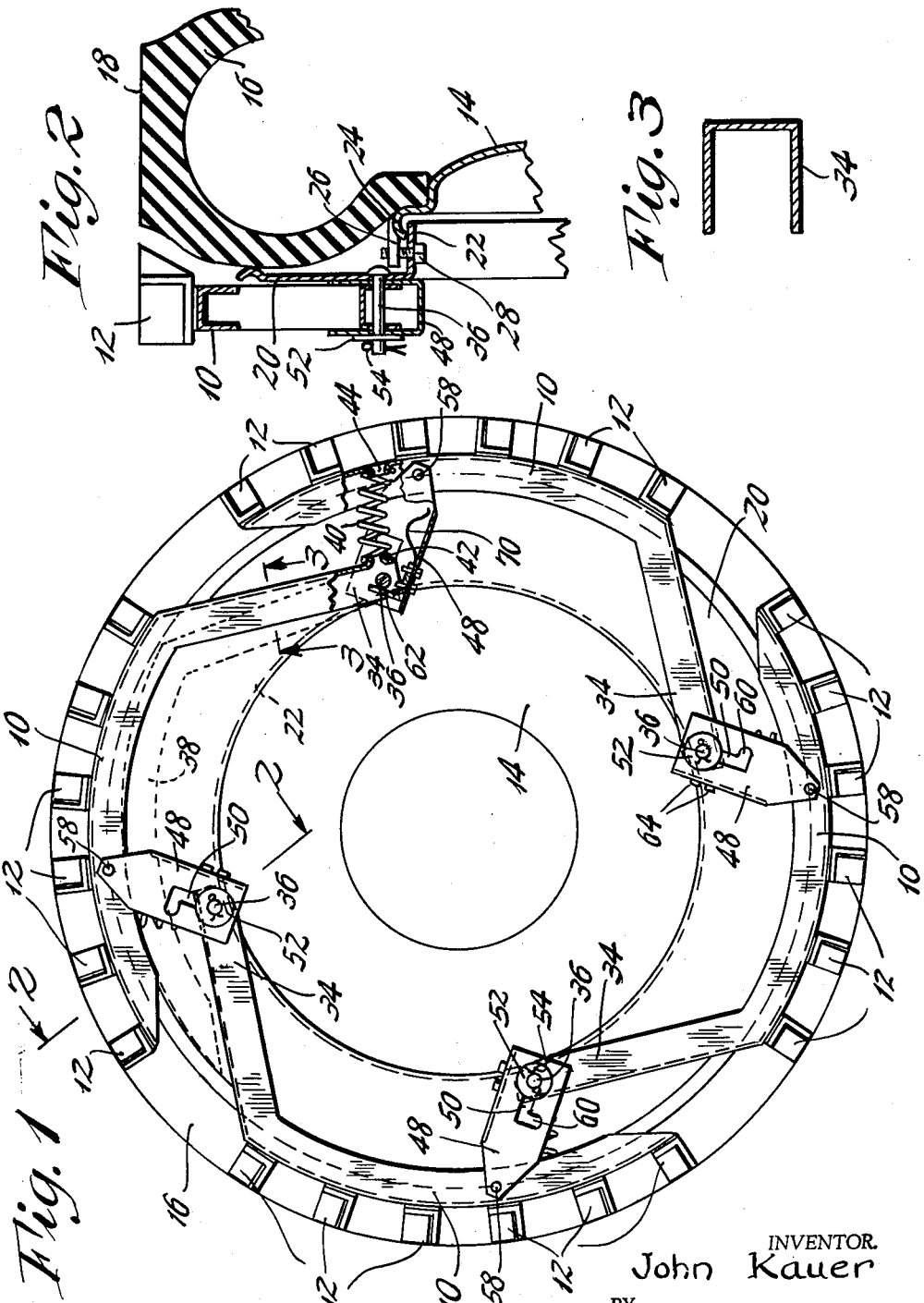
INVENTOR.
John Kauer
BY
AGENT Nov. 26, 1963        J. KAUER        3,112,138
ANTI-SKID ATTACHMENT FOR A VEHICLE WHEEL
Filed May 10, 1962        2 Sheets-Sheet 2
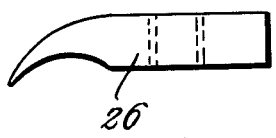
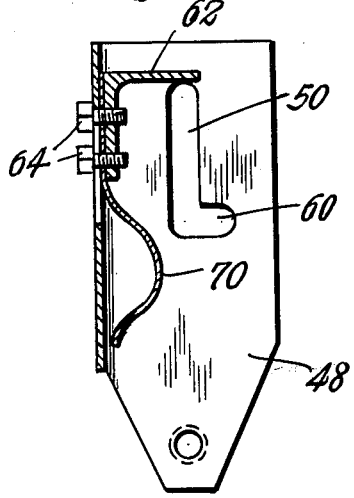
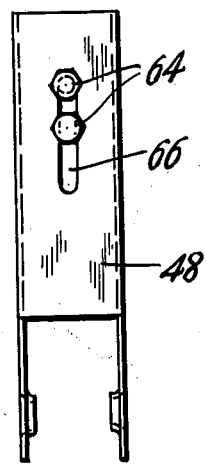
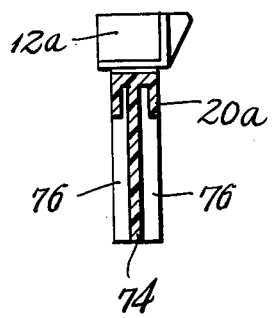
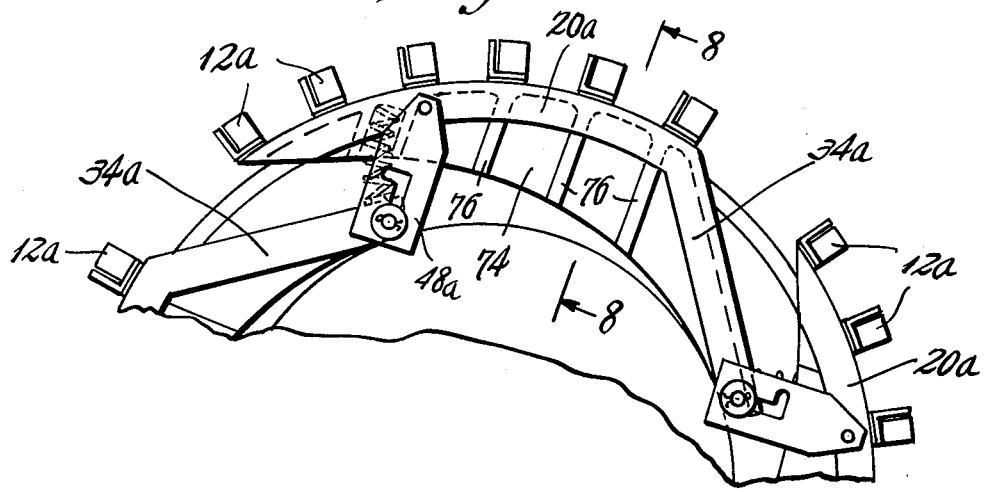
INVENTOR.
John Kauer
BY
AGENT

United States Patent Office 3,112,138
Patented Nov. 26, 1963

3,112,138
ANTI-SKID ATTACHMENT FOR A VEHICLE WHEEL
John Kauer, 15 Castle Hill Drive, Bethel, Conn.
Filed May 10, 1962, Ser. No. 193,680
12 Claims. (Cl. 301—47)

This invention relates to anti-skid devices for vehicles, and more particularly to permanent or semi-permanent attachments adapted to be secured to existing vehicle wheels, for the purpose of minimizing slipping and skidding of the wheels when in snow or mud, or on ice.

An object of the invention is to provide a novel and improved manually operable anti-skid attachment of the kind indicated, which is easily and quickly rendered operative or inoperative as required by existing conditions, such action being readily accomplished even by an inexperienced or unskilled person.

Another object of the invention is to provide an improved anti-skid wheel attachment as above set forth, which is extremely effective in its action to prevent skidding, slippage and the like.

A further object of the invention is to provide an improved wheel attachment as characterized, which is simple in construction and involves relatively few parts, with the result that it may be economically fabricated and produced.

A feature of the invention resides in the provision of an improved anti-skid wheel attachment in accordance with the foregoing, which is strong and sturdy in construction, and therefore not likely to get out of order or become inoperative.

Another feature of the invention resides in the provision of an improved anti-skid attachment as outlined, which requires but little extra space and may be installed without alteration of existing body and fender structures.

Other features and advantages will hereinafter appear.

In the drawings accompanying this specification, similar characters of reference are used to designate like components throughout the several views, wherein:

FIG. 1 is a side elevational view of the anti-skid attachment of the invention, carried by a vehicle wheel.

FIG. 2 is a fragmentary section of the device, taken on the line 2—2 of FIG. 1.

FIG. 3 is another fragmentary section of the device, taken on the line 3—3 of FIG. 1.

FIG. 4 is a side elevational view of one of the clamping pieces utilized to secure the attachment to the vehicle wheel.

FIG. 5 is a side elevational view of one of the locking pieces used for securing the anti-skid members of the device in extended, operative positions.

FIG. 6 is an edge elevational view of the locking piece shown in FIG. 5.

FIG. 7 is a fragmentary side elevational view of a different anti-skid attachment for vehicle wheels, illustrating a modification of the invention.

FIG. 8 is a fragmentary sectional view of the modification, taken on the line 8—8 of FIG. 7.

Referring first to FIGS. 1-6, the wheel attachment as illustrated therein comprises a plurality of curved members or arms 10 having secured thereto anti-skid elements or cleats 12. The elements 12 are arranged along the outer edges of the curved arms 10, being disposed in circumferentially spaced relation whereby the entire set of cleats provides traction along most of the periphery or tire tread of the vehicle wheel on which the attachment is mounted.

As seen in FIG. 1, the anti-skid attachment is secured to a wheel 14 having a pneumatic tire 16, such wheel and tire being of the conventional type commonly provided on pleasure cars.

In accordance with the present invention, the arcuate or curved arms 10 are pivotally mounted on the vehicle wheel 14 so as to be operatively disposed at the outer side of the wheel and pivotally movable between inoperative retracted positions and extended positions, the latter representing the operative condition of the attachment. In FIG. 1 the extended, operative positions of the curved arms 10 are illustrated, said arms presenting the cleats 12 for engagement with the road surface to prevent skidding of the wheel. Preferably the cleats 12 are substantially flush with the outer periphery or tread portion 18 of the tire 16, as clearly seen in FIG. 2.

The pivotal mounting of the anti-skid arms 10 and cleats 12 is effected by means of a generally flat ring-shaped mounting plate 20 having at its inner periphery an inturned or lateral flange 22 adapted for engagement with the edge 24 of the wheel or rim 14. Preferably, the flange 22 is slightly smaller in diameter than the rim edge 24 whereby it snugly fits within the latter, thereby to be securely positioned and prevented from having any eccentricity. The mounting plate 20 is clamped to the rim edge 24 by a plurality of clamping pieces 26, four such pieces being indicated in FIG. 1. Bolts 28 secure the clamping pieces 26 to the figure 22 and also effect the clamping of the edge 24 of the wheel between the flange and clamping pieces.

As indicated in FIGS. 1 and 2, the outer peripheral portion of the ring-shaped mounting plate 20 is embossed or formed to provide a broad circular bead 30 for purposes of rigidity and also to present a rounded edge surface to the tire 16 whereby abrasion and cutting of the latter is prevented.

In accordance with the invention, the curved arms 10 are provided with angularly extended end mounting portions 34 which are pivotally carried by pins or rivets 36 rigidly secured to the inner peripheral portion of the mounting plate 20. With such mounting, the curved arms 10 may be swung inward from the extended operative positions shown to retracted, inoperative positions one of which is indicated by the broken outline in FIG. 1, designated 38.

The curved anti-skid arms 10 are yieldably biased or urged to the extended positions shown, by helical compression springs 40 secured in place by drifted portions 42 and 44 respectively provided on the angularly extended mounting ends 34 of the curved arms 10 and on the curved arms themselves. With such construction, the arms 10 will be normally held in their extended, operative positions, and the action of centrifugal force as the wheel is turned will tend to maintain such disposition of the arms, supplementing the action of the springs 40, as will be readily understood.

Further, in accordance with the invention, novel locking means are provided, by which the arms 10 may be held in their retracted, inoperative positions when it is desired to not utilize the anti-skid attachment. The said locking means comprises link members 48 having L-shaped slots 50 through which the pivot studs 36 extend. Washers 52 and cotter pins 54 are carried by the pivot studs 36, to maintain the locking links 48 in place. The links 48 are pivotally connected to the curved arms 10, as by pivot pins or rivets 58.

It will now be understood that the locking links 48 may be utilized to limit the outward movement or positioning of the curved arms 10 as shown in FIG. 1, and also may be utilized to lock the arms 10 in their retracted, inoperative positions. For such locking of the arms 10 in their retracted positions, the lateral offset portions 60 of the L-shaped slots 50 will accommodate the pivot studs 36.

The present invention also provides an adjustable stop, carried by the link pieces 48, for the purpose of changing the extended positions of the curved arms 10, within limits. As seen in FIGS. 1 and 5, each stop comprises an angle piece 62 secured to the link 48 by a pair of screws 64, the said screws passing through a slot 66 in the link. By adjustably positioning the stops 62, the amount of extension of the curved arms 10 may be adjusted to suit various sizes of wheels and tires.

Further, the invention provides spring devices in connection with the link pieces 48, whereby the latter are biased in clockwise directions as viewed in FIG. 1, to retain the locking links in their locking position once these have been attained, and to automatically shift the links to such positions when the curved arms 10 are moved from the FIG. 1 positions to retracted positions. Referring to FIG. 5, leaf springs 70 are secured under the angular adjustable stops 62, such leaf springs having circular portions arranged for engagement with the arm ends 34.

It will now be understood from the foregoing that the anti-skid arms 10 and cleats 12 will be securely retained in retracted, inoperative positions by the locking links 48, which are automatically operative to effect the locking in response to the user merely forcing the arms 10 radially inward. When this has been done, the anti-skid attachment is conditioned so as to be substantially out of contact with the road, and to be inoperative for all practical purposes.

When it is desired to render the attachment operative, the user merely applies clockwise pressure to the locking links 48, thereby effecting their release whereupon the compression coil springs 40 will move the anti-skid arms 10 outward to the extended positions shown.

The attachment is seen to be relatively simple in construction, involving few parts whereby it may be economically fabricated and produced. Moreover, by virtue of the securement of the attachment to the wheel rim, it is sturdily mounted and will not readily become loose. The curved arms 10 and the angular extensions 34 together with the mounting plate 20 may be fabricated of heavy gauge metal whereby the device is strong and sturdy, and not likely to fail when in operation. Even an inexperienced person may easily render the device operative or inoperative, as conditions might dictate.

A modification of the invention is illustrated in FIGS. 7 and 8, wherein like components have been given similar characters. In these figures, the curved anti-skid arms and angular extensions are molded of one-piece plastic, as distinguished from the metal construction illustrated in FIGS. 1–6. As shown in FIGS. 7 and 8, the curved arm 20a has an angular extension 34a, and further has a relatively wide, central strengthening and reinforcing rib 74 extending for the length of the arm and extension as shown. Lateral ribs or beads 76 are also provided, to give added strength to the molded piece. The two-piece locking line is indicated at 48a.

The cleats or anti-skid elements 12a may be of metal or other suitable substance having wear resistant properties. They may be secured to the curved arm 20a in any suitable manner. With the advent of high strength plastic formulations newly developed, it becomes feasible to fabricate the anti-skid arms of such substance.

Variations and modifications may be made within the scope of the claims, and portions of the improvement may be used without others.

I claim:

1. An anti-skid attachment for a vehicle wheel comprising, in combination:
   (a) a plurality of pivotal arms,
   (b) anti-skid elements carried by said arms along the outer edges thereof,
   (c) means for pivotally mounting the said arms on the outer side of a vehicle wheel, for pivotal movement between retracted and extended positions,
   (d) manually operable means for maintaining said arms in either the retracted or the extended positions, said arms when extended presenting the anti-skid elements for engagement with the road surface, to prevent skidding of the wheel,
   (e) spring means normally biasing the arms extended,
   (f) locking devices pivotally connected with the said mounting means and with the arms, for releasably holding the latter in retracted positions,
   (g) there being the same number of spring means as locking devices,
   (h) the locking devices comprising pivotal link members, and
   (i) said spring means and link members being paired and juxtaposed in side by side relation.

2. An anti-skid attachment for a vehicle wheel comprising, in combination:
   (a) a plurality of curved arms,
   (b) anti-skid elements carried by said arms along the outer edges thereof,
   (c) means for pivotally mounting the said arms on the outer side of a vehicle wheel, for pivotal movement between retracted and extended positions,
   (d) manually operable means for maintaining said arms in either the retracted or the extended positions, said arms when extended presenting the anti-skid elements for engagement with the road surface, to prevent skidding of the wheel,
   (e) springs normally biasing the arms extended,
   (f) locking devices pivotally connected with the said mounting means and with the arms, for releasably holding the latter in retracted positions,
   (g) said springs comprising helical compression coils,
   (h) the locking devices comprising pivotal link members, and
   (i) said coils and link members being paired and juxtaposed in side by side relation.

3. An anti-skid attachment as in claim 2, wherein:
   (a) the locking devices include studs, and
   (b) the link members have slots into which the studs extend,
   (c) said slots having laterally extended notches adapted to be occupied by the studs to maintain the curved arms in retracted positions and the springs in compressed condition.

4. An anti-skid attachment as in claim 3, wherein:
   (a) the link members are pivotally connected to the curved arms, and
   (b) the studs are carried by the said mounting means.

5. An anti-skid attachment as in claim 4, wherein:
   (a) there are spring devices engageable with the link members to bias the latter to positions wherein the studs occupy the notches.

6. An anti-skid attachment as in claim 4, wherein:
   (a) there are adjustable stops connected with the link members and engageable with the studs, to limit the movement of the link members with respect to the studs.

7. An anti-skid attachment as in claim 6, wherein:
   (a) the adjustable stops comprise angle pieces adjustably carried by the link members, said pieces extending into the path of movement of the studs and being located adjacent the slots of the link members.

8. An anti-skid attachment as in claim 4, wherein the studs constitute part of the said mounting means and comprise the pivotal axes of the curved arms.

9. An anti-skid attachment as in claim 2, wherein:
   (a) the mounting means comprises a ring-shaped plate, said curved arms being carried by the plate, and
   (b) the compression coils are disposed between the ring-shaped plate and the link members.

10. An anti-skid attachment as in claim 9, wherein:
    (a) the mounting means comprises a flange on the ring-shaped plate, and
    (b) the mounting means further comprises clamp pieces carried by the flange, said flange and clamp pieces being engageable with the wheel rim to clamp the same.

11. An anti-skid attachment as in claim 2, wherein:
(a) the mounting means comprises a ring-shaped plate,
(b) the curved arms have angularly extended end portions,
(c) the mounting means further comprises pivot studs arranged along the inner periphery of the plate and connected to the angularly extended end portions of the curved arms.

12. An anti-skid attachment as in claim 11, wherein:
(a) the link members have L-shaped slots through which the studs extend,
(b) the link members are pivotally connected to the curved arms at points intermediate their ends,
(c) the springs are connected to the said intermediate points on the arms and also to the angularly extended end portions of the arms.

References Cited in the file of this patent
UNITED STATES PATENTS

| | | |
|---|---|---|
| 1,308,513 | Voegeli | July 1, 1919 |
| 2,437,325 | Koeppel | Mar. 9, 1948 |
| 2,911,091 | Imse | Nov. 3, 1959 |